United States Patent
Jo

(10) Patent No.: US 9,176,303 B2
(45) Date of Patent: Nov. 3, 2015

(54) LENS MODULE

(71) Applicant: SAMSUNG ELECTRO-MECHANICS CO., LTD., Suwon-Si (KR)

(72) Inventor: Yong Joo Jo, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/246,977

(22) Filed: Apr. 7, 2014

(65) Prior Publication Data

US 2015/0116843 A1    Apr. 30, 2015

(30) Foreign Application Priority Data

Oct. 24, 2013 (KR) .......... 10-2013-0127227
Dec. 16, 2013 (KR) .......... 10-2013-0156093

(51) Int. Cl.
*G02B 3/02* (2006.01)
*G02B 13/18* (2006.01)
*G02B 9/62* (2006.01)
*G02B 13/00* (2006.01)

(52) U.S. Cl.
CPC .............. *G02B 13/0045* (2013.01); *G02B 9/62* (2013.01)

(58) Field of Classification Search
CPC .............................. G02B 9/62; G02B 13/0045
USPC .................................................. 359/713, 759
See application file for complete search history.

(56) References Cited

U.S. PATENT DOCUMENTS

| | | | |
|---|---|---|---|
| 8,854,745 B1 * | 10/2014 | Chen | .......... 359/713 |
| 2012/0194726 A1 | 8/2012 | Huang | |
| 2012/0314304 A1 | 12/2012 | Huang | |
| 2015/0029599 A1 * | 1/2015 | Huang | .......... 359/713 |

FOREIGN PATENT DOCUMENTS

| | | |
|---|---|---|
| JP | 2011-85733 A | 4/2011 |
| KR | 10-2008-0057738 A | 6/2008 |
| KR | 10-2008-0061461 A | 7/2008 |

OTHER PUBLICATIONS

Office Action dated Apr. 30, 2014 for corresponding Korean Patent Application No. 10-2013-0156093 and its English summary provided by Applicant's foreign counsel.

* cited by examiner

*Primary Examiner* — William Choi
(74) *Attorney, Agent, or Firm* — NSIP Law

(57) ABSTRACT

A lens module include: a first lens having positive refractive power; a second lens having positive refractive power; a third lens having refractive power; a fourth lens having positive refractive power; a fifth lens having refractive power; and a sixth lens having negative refractive power and having an inflection point formed on an image-side surface thereof. The lens module may satisfy the following Conditional expressions: 0.36<SD/f<0.48, where SD is a size of a stop opening and f is an overall focal length of the lens module.

27 Claims, 10 Drawing Sheets

| NOTE | RADIUS OF CURVATURE | RADIUS OF CURVATURE | THICKNESS /DISTANCE | H1 | H2 | GLA |
|---|---|---|---|---|---|---|
| 1 | A(1) | A(2) | 0.49 | 2.18 | 2.0518 | 544.560 |
| | | | 0.0995 | | | |
| 2 | A(3) | A(4) | 0.492 | 2.0117 | 1.9087 | 544.560 |
| | | | 0 | | | |
| STOP | | | | 1.86 | | |
| | | | 0.04 | | | |
| 3 | A(5) | A(6) | 0.331 | 1.8862 | 1.9682 | 639.230 |
| | | | 0.4271 | | | |
| 4 | A(7) | A(8) | 0.427 | 2.1266 | 2.6146 | 639.230 |
| | | | 0.593 | | | |
| 5 | A(9) | A(10) | 0.512 | 3.4621 | 4.2105 | 639.230 |
| | | | 0.05 | | | |
| 6 | A(11) | A(12) | 0.7877 | 5.3919 | 5.6434 | 544.560 |
| | | | 0.3201 | | | |
| 7 | INF | INF | 0.3 | 6.0791 | 6.2371 | 517.642 |
| | | | 0.1182 | | | |
| | | | 0.632 | | | |

FIG. 4

| ASPHERIC | CURV | K | A | B | C | D |
|---|---|---|---|---|---|---|
| | E | F | G | H | | |
| A(1) | 0.502275 | -0.562911 | -0.010596 | 0.018274 | -0.068862 | 0.122502 |
| | -0.121685 | 0.064635 | -0.013866 | 0.000000 | 0.000000 | |
| A(2) | 0.303030 | -3.224510 | -0.075012 | 0.053039 | -0.090889 | 0.251590 |
| | -0.334330 | 0.221395 | -0.057329 | 0.000000 | 0.000000 | |
| A(3) | 0.376396 | -0.857684 | -0.078672 | 0.066570 | -0.152524 | 0.409358 |
| | -0.559875 | 0.373536 | -0.100178 | 0.000000 | 0.000000 | |
| A(4) | -0.040415 | 0.000000 | -0.118398 | 0.402775 | -0.913061 | 1.241640 |
| | -1.122810 | 0.615377 | -0.151681 | 0.000000 | 0.000000 | |
| A(5) | 0.109435 | 53.474149 | -0.138350 | 0.474058 | -1.039920 | 1.431180 |
| | -1.324970 | 0.765420 | -0.199390 | 0.000000 | 0.000000 | |
| A(6) | 0.419728 | -8.029526 | 0.027418 | 0.084392 | -0.097878 | 0.014182 |
| | 0.085445 | -0.073241 | 0.023555 | 0.000000 | 0.000000 | |
| A(7) | -0.096518 | -209.715656 | -0.082444 | -0.001728 | 0.128505 | -0.196191 |
| | 0.139239 | -0.044901 | 0.000000 | 0.000000 | 0.000000 | |
| A(8) | -0.162472 | 0.000000 | -0.038840 | -0.034786 | 0.113036 | -0.115989 |
| | 0.074022 | -0.027393 | 0.004127 | 0.000000 | 0.000000 | |
| A(9) | -0.227693 | -105.698143 | 0.028034 | -0.071213 | 0.048854 | -0.020315 |
| | 0.004591 | -0.000425 | 0.000000 | 0.000000 | 0.000000 | |
| A(10) | -0.173788 | 2.120412 | 0.045151 | -0.021888 | 0.000858 | 0.002212 |
| | -0.000936 | 0.000176 | -0.000013 | 0.000000 | 0.000000 | |
| A(11) | 0.493461 | -13.452225 | -0.105482 | 0.061588 | -0.026816 | 0.007236 |
| | -0.001099 | 0.000087 | -0.000003 | 0.000000 | 0.000000 | |
| A(12) | 0.669540 | -6.313348 | -0.061053 | 0.024213 | -0.007773 | 0.001573 |
| | -0.000198 | 0.000014 | 0.000000 | 0.000000 | 0.000000 | |

FIG. 5

| NOTE | RADIUS OF CURVATURE | RADIUS OF CURVATURE | THICKNESS /DISTANCE | H1 | H2 | GLA |
|---|---|---|---|---|---|---|
| 1 | A(1) | A(2) | 0.50 | 2.34 | 2.2027 | 544.56 |
| | | | 0.09 | | | |
| 2 | A(3) | A(4) | 0.54 | 2.1609 | 2.0459 | 544.56 |
| | | | 0.00 | | | |
| APERTURE | STOP | | | 2.2 | | |
| | | | 0.04 | | | |
| 3 | A(5) | A(6) | 0.28 | 2.0177 | 2.0349 | 639.23 |
| | | | 0.45 | | | |
| 4 | A(7) | A(8) | 0.50 | 2.184 | 2.8026 | 639.23 |
| | | | 0.53 | | | |
| 5 | A(9) | A(10) | 0.48 | 3.6224 | 4.33 | 639.23 |
| | | | 0.05 | | | |
| 6 | A(11) | A(12) | 0.79 | 5.38 | 5.625 | 544.56 |
| | | | 0.29 | | | |
| 7 | INF | INF | 0.31 | 6.1195 | 6.2792 | 517.642 |
| | | | 0.12 | | | |
| | | | 0.62 | | | |

FIG. 9

| ASPHERIC | CURV | K | A | B | C | D |
|---|---|---|---|---|---|---|
| | E | F | G | H | | |
| A(1) | 0.496781 | -0.528487 | -0.009916 | 0.015258 | -0.056071 | 0.092902 |
| | -0.082897 | 0.039530 | -0.007737 | 0.000000 | 0.000000 | |
| A(2) | 0.328388 | -2.807598 | -0.076118 | 0.055828 | -0.109381 | 0.300055 |
| | -0.375175 | 0.228808 | -0.055467 | 0.000000 | 0.000000 | |
| A(3) | 0.434377 | -0.194655 | -0.080554 | 0.078579 | -0.237632 | 0.631787 |
| | -0.810041 | 0.508051 | -0.128318 | 0.000000 | 0.000000 | |
| A(4) | -0.006798 | -380858 | -0.128197 | 0.323181 | -0.529327 | 0.559675 |
| | -0.465332 | 0.277001 | -0.078582 | 0.000000 | 0.000000 | |
| A(5) | 0.114282 | 53.474149 | -0.146522 | 0.381758 | -0.580448 | 0.539056 |
| | -0.407504 | 0.260981 | -0.082043 | 0.000000 | 0.000000 | |
| A(6) | 0.409125 | -7.588988 | 0.018048 | 0.119033 | -0.161167 | 0.140564 |
| | -0.105859 | 0.076797 | -0.020630 | 0.000000 | 0.000000 | |
| A(7) | -0.095828 | -210 | -0.080690 | -0.001667 | 0.122215 | -0.183931 |
| | 0.128680 | -0.040905 | 0.000000 | 0.000000 | 0.000000 | |
| A(8) | -0.158899 | 0.000000 | -0.044351 | -0.024788 | 0.084669 | -0.072299 |
| | 0.039652 | -0.013118 | 0.001738 | 0.000000 | 0.000000 | |
| A(9) | -0.207761 | -106 | 0.034537 | -0.096734 | 0.069446 | -0.027441 |
| | 0.005967 | -0.000546 | 0.000000 | 0.000000 | 0.000000 | |
| A(10) | -0.161880 | 2.426506 | 0.071164 | -0.071745 | 0.036147 | -0.011102 |
| | 0.002004 | -0.000184 | 0.000006 | 0.000000 | 0.000000 | |
| A(11) | 0.440823 | -13.452571 | -0.099172 | 0.041662 | -0.014656 | 0.003820 |
| | -0.000590 | 0.000048 | -0.000002 | 0.000000 | 0.000000 | |
| A(12) | 0.628934 | -6.438096 | -0.060395 | 0.020665 | -0.005995 | 0.001112 |
| | -0.000129 | 0.000009 | 0.000000 | 0.000000 | 0.000000 | |

FIG. 10

LENS MODULE

CROSS-REFERENCE TO RELATED APPLICATIONS

This application claims the benefit of Korean Patent Application No. 10-2013-0127227 filed on Oct. 24, 2013, and Korean Patent Application No. 10-2013-0156093 filed on Dec. 16, 2013, with the Korean Intellectual Property Office, the disclosures of which are incorporated herein in its entirety by reference.

BACKGROUND

The present technology generally relates to a lens module having an optical system including six lenses.

Recently, mobile terminals have included camera modules, allowing for video telephony as well as image capturing. Further, as camera functions have gradually increased in mobile terminals, demand for mobile terminal camera modules to have high resolution and high performance has been gradually increased.

However, since mobile terminals are gradually being miniaturized and lightened, there are limitations on implementing high resolution, high performance cameras.

In order to solve the above-mentioned problem, camera lenses have recently been formed of plastic, a lighter material than glass, and lens modules have been configured of five or more lenses in order to implement high degrees of resolution.

However, it may be difficult to solve the problem of chromatic aberration in the case of lenses formed of plastic, as compared to lenses formed of the glass, and it may be difficult to implement a relatively bright optical system.

SUMMARY

Some embodiments of the present disclosure may provide a lens module capable of implementing high resolution.

According to some embodiments of the present disclosure, a lens module may include: a first lens having positive refractive power; a second lens having positive refractive power; a third lens having refractive power; a fourth lens having positive refractive power; a fifth lens having refractive power; and a sixth lens having negative refractive power and having an inflection point formed on an image-side surface thereof, wherein the lens module satisfies the following Conditional expressions: [Conditional expressions] $0.36<SD/f<0.48$, where SD is a size of a stop opening and f is an overall focal length of the lens module.

The third lens may have negative refractive power.

The fifth lens may have negative refractive power.

An object-side surface of the first lens may be convex, and an image-side surface thereof may be concave.

An object-side surface of the second lens may be convex, and an image-side surface thereof may be convex.

An object-side surface of the third lens may be convex, and an image-side surface thereof may be concave.

An object-side surface of the fourth lens may be concave, and an image-side surface thereof may be convex.

An object-side surface of the fifth lens may be concave, and an image-side surface thereof may be convex.

An object-side surface of the sixth lens may be convex, and the image-side surface thereof may be concave.

The sixth lens may have an inflection point formed on an object-side surface thereof.

The lens module may satisfy the following Conditional expressions: [Conditional expressions] $1.1<TTL/f<1.4$, where TTL is a distance from an object-side surface to an image surface of the first lens, and f is an overall focal length of the lens module.

The lens module may satisfy the following Conditional expressions: [Conditional expressions] $V4-V5<5.0$, where V4 is an Abbe number of the fourth lens, and V5 is an Abbe number of the fifth lens.

The lens module may satisfy the following Conditional expressions: [Conditional expressions] $|R2|-|R1|>0$, where R1 is a radius of curvature of an object-side surface of the first lens, and R2 is a radius of curvature of an image-side surface of the first lens.

The lens module may satisfy the following Conditional expressions: [Conditional expressions] $SA<36$, where SA is a sweep angle of the image-side surface of the sixth lens.

According to some embodiments of the present disclosure, a lens module may include: a first lens having positive refractive power; a second lens having positive refractive power; a third lens having refractive power; a fourth lens having positive refractive power; a fifth lens having refractive power; and a sixth lens having negative refractive power, wherein it satisfies the following Conditional expressions: [Conditional expressions] $V5<30$, where V5 is an Abbe number of the fifth lens.

The third lens may have negative refractive power.

The fifth lens may have negative refractive power.

An object-side surface of the first lens may be convex, and an image-side surface thereof may be concave.

An object-side surface of the second lens may be convex, and an image-side surface thereof may be convex.

An object-side surface of the third lens may be convex, and an image-side surface thereof may be concave.

An object-side surface of the fourth lens may be concave, and an image-side surface thereof may be convex.

An object-side surface of the fifth lens may be concave, and an image-side surface thereof may be convex.

An object-side surface of the sixth lens may be convex, and an image-side surface thereof may be concave.

The sixth lens may have an inflection point formed on an object-side surface thereof.

The lens module may satisfy the following Conditional expressions: [Conditional expressions] $1.1<TTL/f<1.4$, where TTL is a distance from an object-side surface to an image surface of the first lens, and f is an overall focal length of the lens module.

The lens module may satisfy the following Conditional expressions: [Conditional expressions] $V4-V5<5.0$, where V4 is an Abbe number of the fourth lens, and V5 is an Abbe number of the fifth lens.

The lens module may satisfy the following Conditional expressions: [Conditional expressions] $|R2|-|R1|>0$, where R1 is a radius of curvature of an object-side surface of the first lens, and R2 is a radius of curvature of an image-side surface of the first lens.

The lens module may satisfy the following Conditional expressions: [Conditional expressions] $SA<36$, where SA is a sweep angle of an image-side surface of the sixth surface.

The lens module may satisfy the following Conditional expressions: [Conditional expressions] $0.36<SD/f<0.48$, where SD is a size of a stop opening and f is an overall focal length of the lens module.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 4 and 5 are tables showing characteristics of the lens module shown in FIG. 1;

FIGS. 9 and 10 are tables showing characteristics of the lens module shown in FIG. 6.

DETAILED DESCRIPTION

Figure 1:
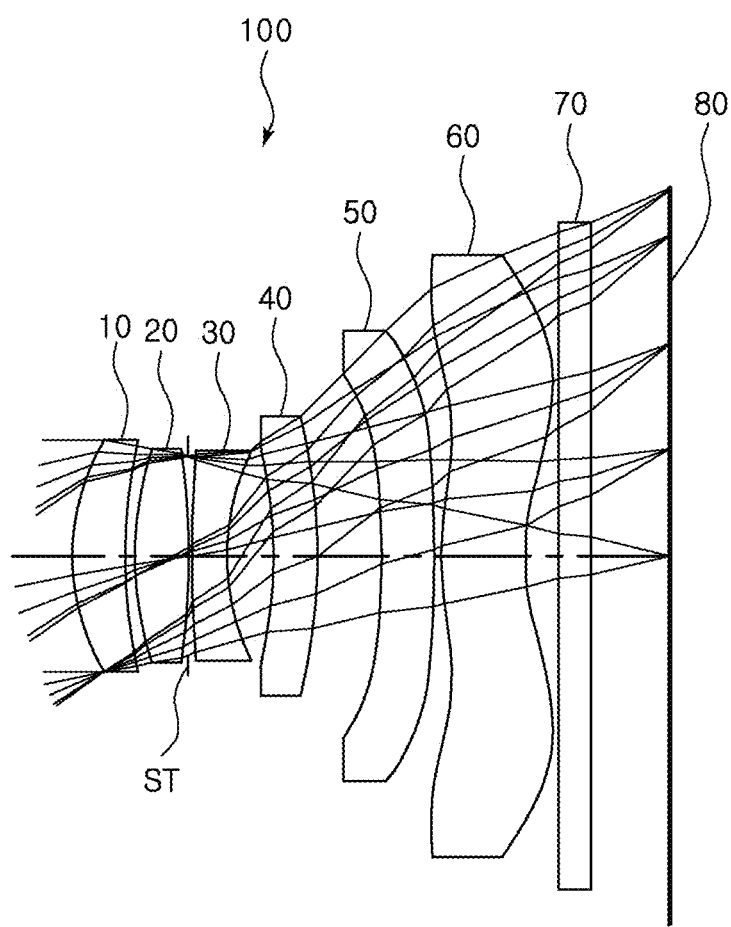
FIG. 1 is a configuration view of a lens module according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, in the present specification, it is to be noted that a first lens refers to a lens that is the closest to an object, and a sixth lens refers to a lens that is the closest to an image sensor. Further, it is to be noted that the term 'forward' refers to a direction from the lens module toward the object, while the term 'backward' refers to a direction from the lens module toward the image sensor. In addition, it is to be noted that a first surface of each lens refers to a surface disposed toward the object (or an object-side surface) and a second surface of each lens refers to a surface disposed toward the image sensor (or an image-side surface). Further, in the present specification, units of all of a radius of curvature, a thickness, a TTL, an SL, an IMGH of the lens, an overall focal length of the optical system, and a focal length of each lens are provided in millimeters (mm). Further, in descriptions of lens shapes, the meaning that one surface of the lens being convex is that an optical axis portion of the corresponding surface is convex, and the meaning that one surface of the lens is concave is that an optical axis portion of the corresponding surface is concave. Therefore, although it is described that one surface of the lens is convex, an edge portion of the lens may be concave. Likewise, although it is described that one surface of the lens is concave, an edge portion of the lens may be convex.

Figure 2:
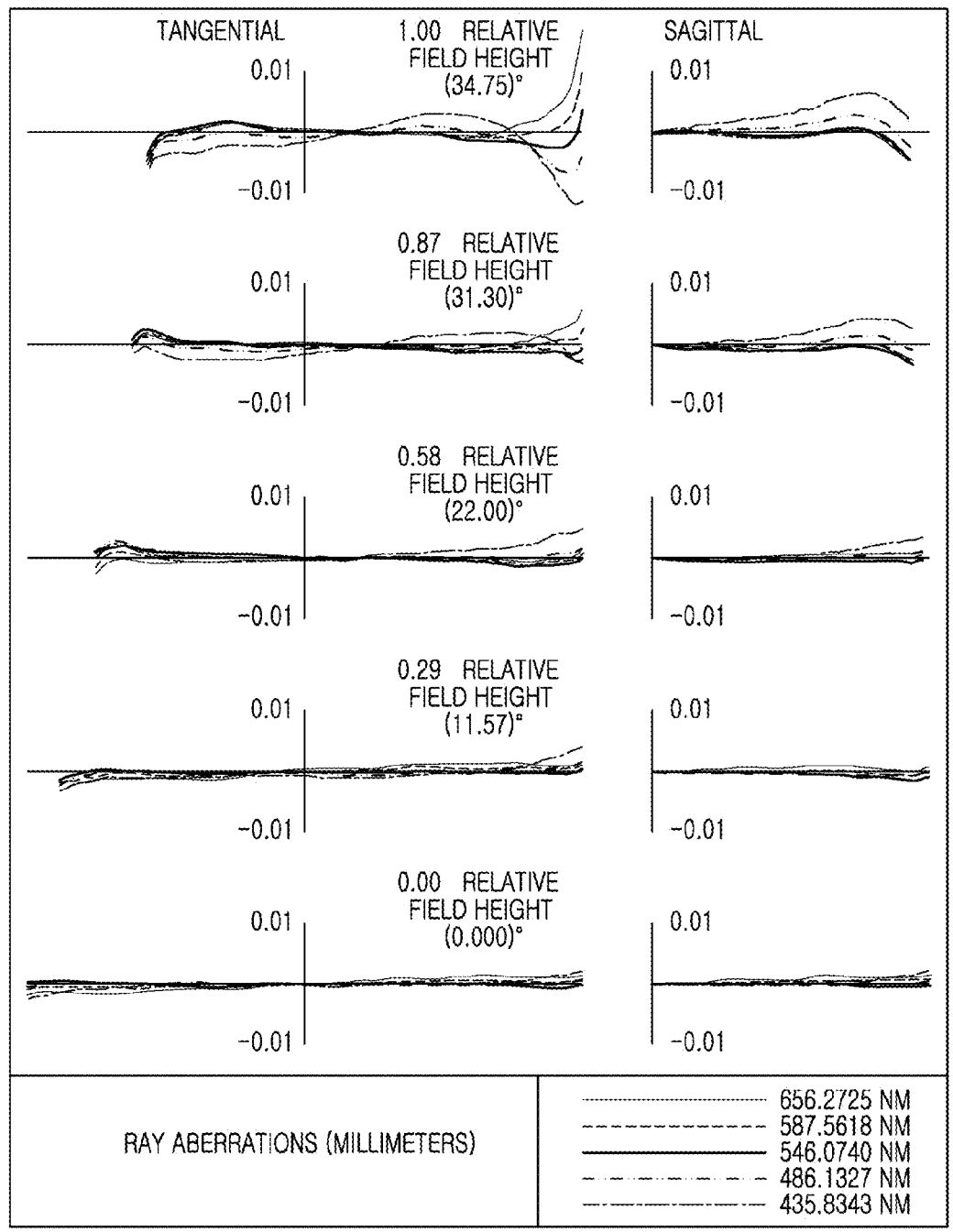
FIGS. 2 and 3 are graphs showing aberration characteristics of the lens module shown in FIG. 1.
Figure 3:
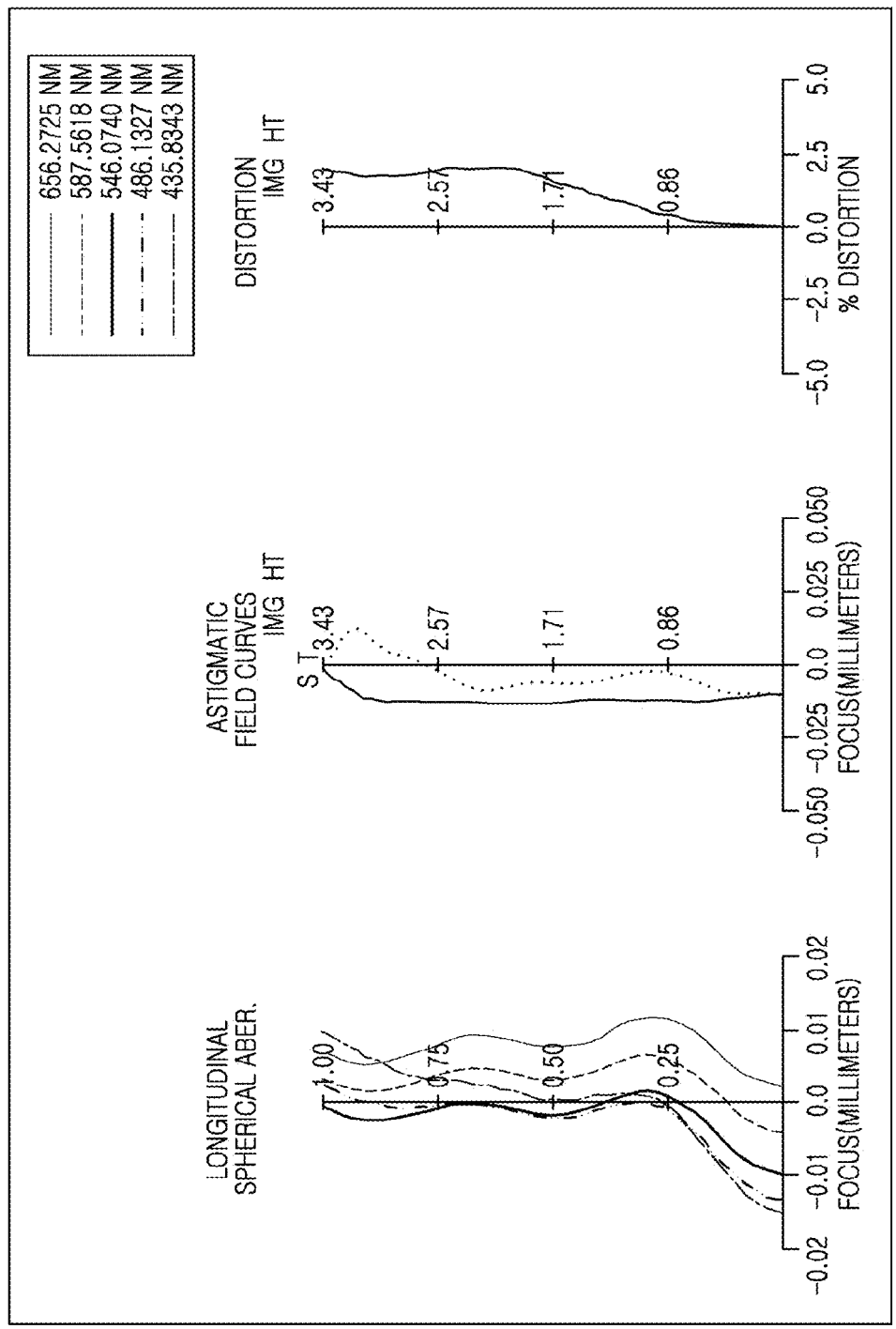
Figure 6:
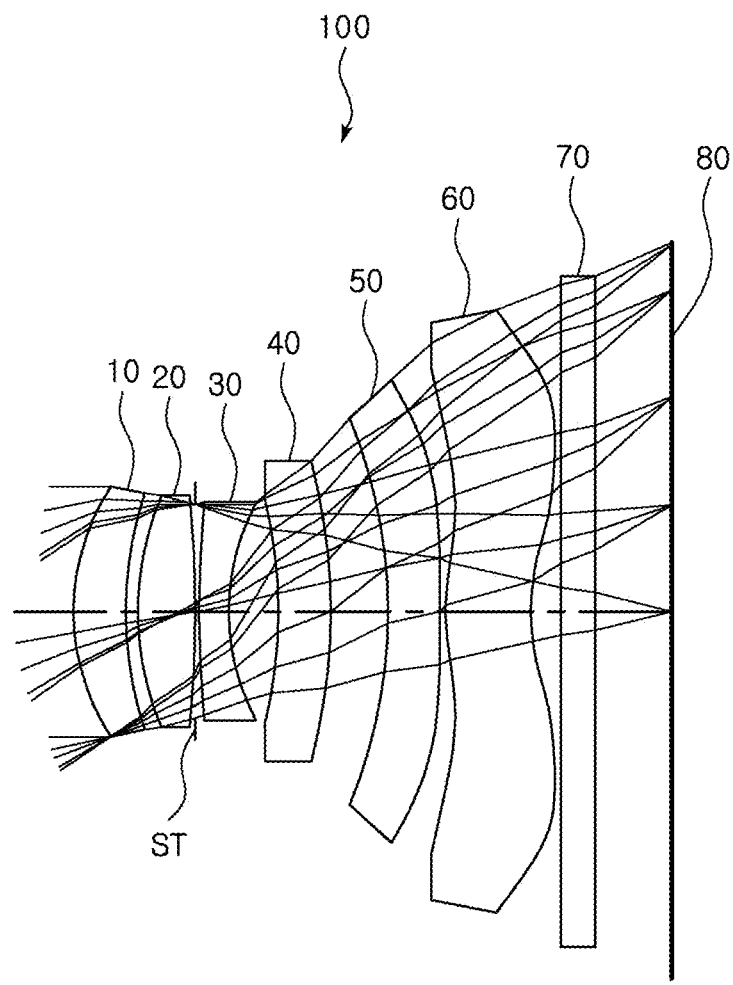
FIG. 6 is a configuration view of a lens module according to another exemplary embodiment of the present disclosure.
Figure 7:
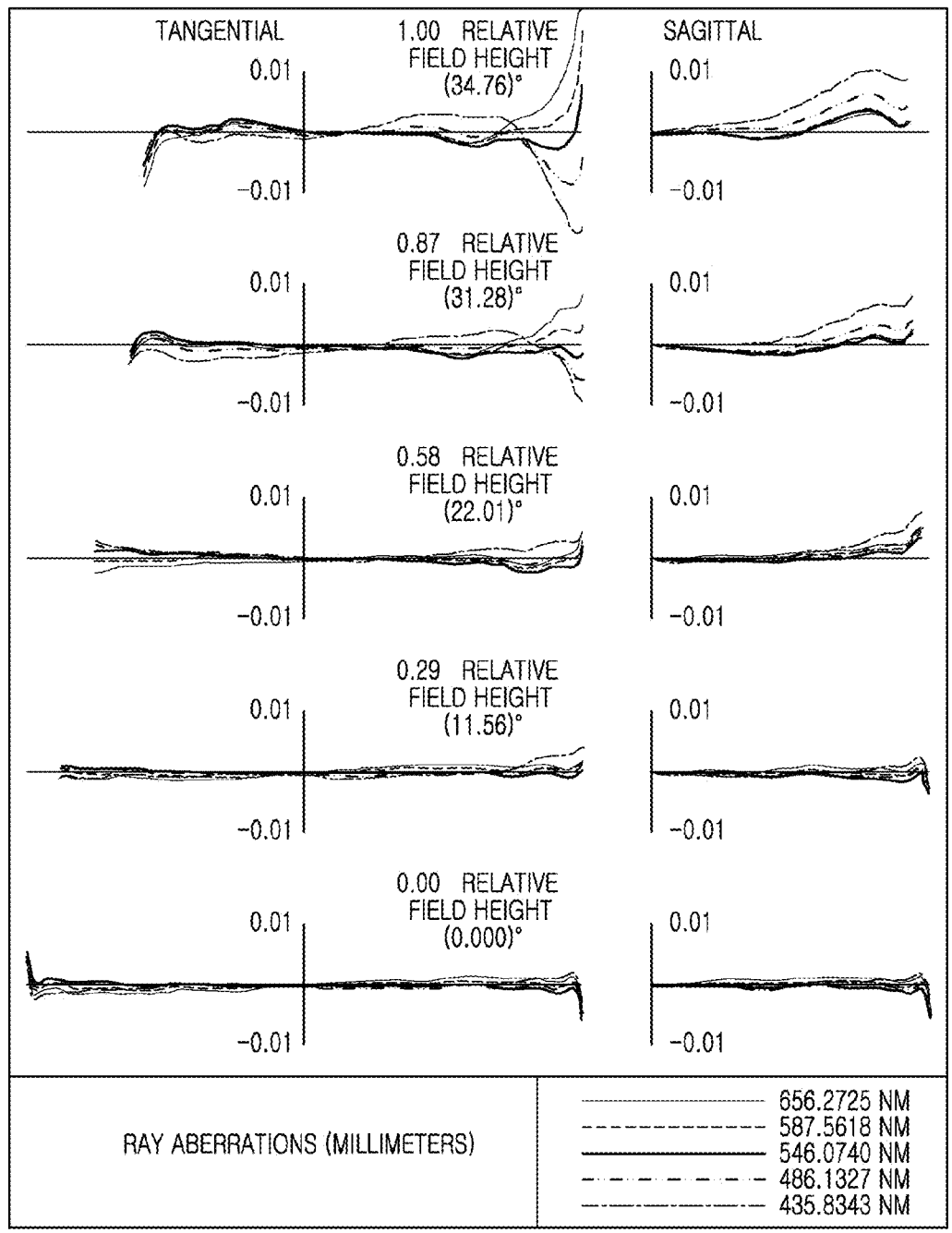
FIGS. 7 and 8 are graphs showing aberration characteristics of the lens module shown in FIG. 6.
Figure 8:
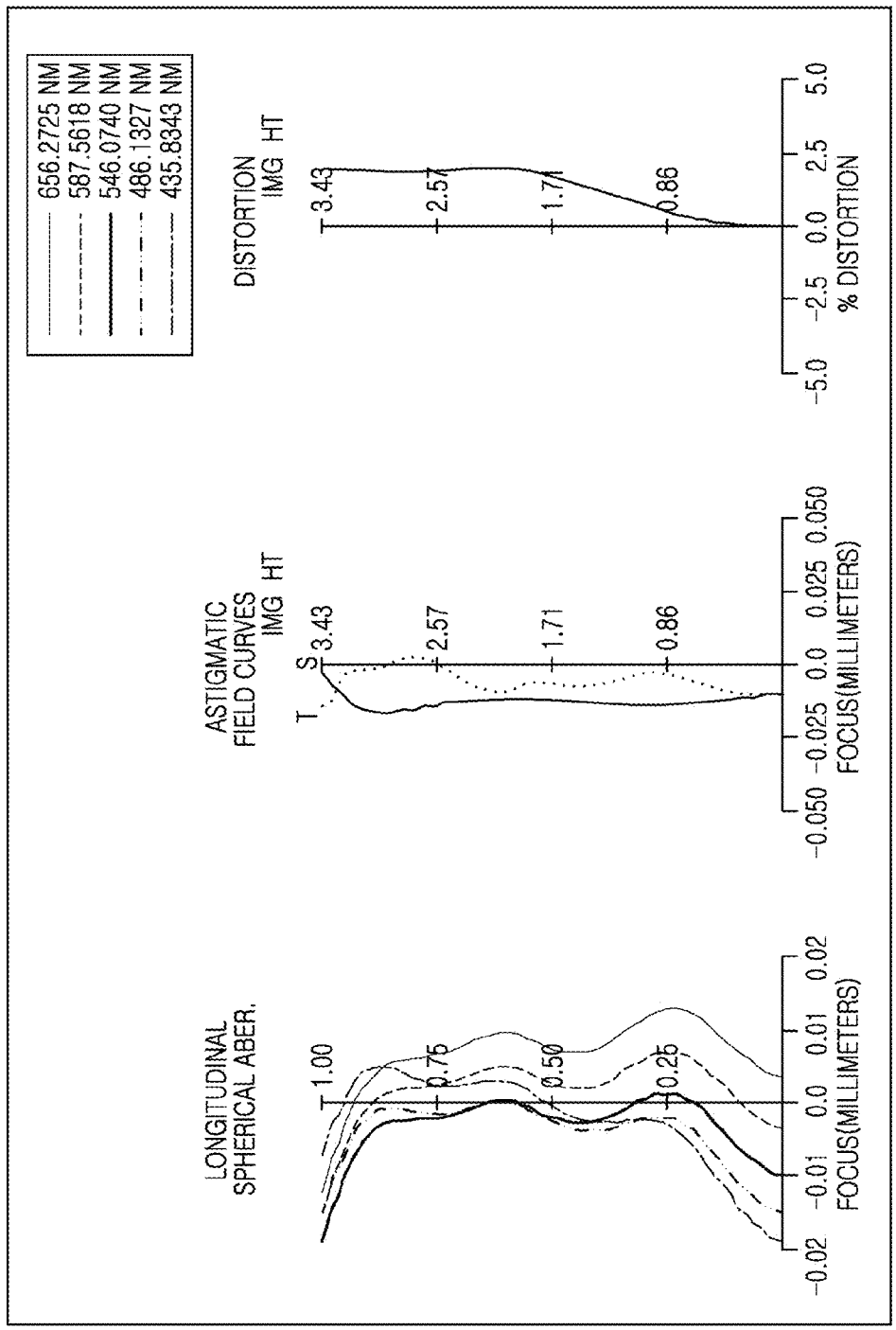

FIG. 1 is a configuration view of a lens module according to an exemplary embodiment of the present disclosure, FIGS. 2 and 3 are graphs showing aberration characteristics of the lens module shown in FIG. 1, FIGS. 4 and 5 are tables showing characteristics of the lens module shown in FIG. 1, FIG. 6 is a configuration view of a lens module according to another exemplary embodiment of the present disclosure, FIGS. 7 and 8 are graphs showing aberration characteristics of the lens module shown in FIG. 6, and FIGS. 9 and 10 are tables showing characteristics of the lens module shown in FIG. 6.

A lens module according to an exemplary embodiment of the present invention may include an optical system including six lenses. Specifically, the lens module may include a first lens, a second lens, a third lens, a fourth lens, a fifth lens, and a sixth lens. However, the lens module is not limited to including only six lenses, but may further include other components, if necessary. For example, the lens module may include a stop for adjusting an amount of light. In addition, the lens module may further include an infrared cut-off filter for filtering infrared light. In addition, the lens module may further include an image sensor (i.e., an imaging device) for converting an image of a subject incident through the optical system into an electrical signal. In addition, the lens module may further include interval maintaining members for adjusting distances between lenses.

The first lens to the sixth lens configuring the optical system may be formed of plastic. Further, at least one of the first lens to the sixth lens may have an aspherical surface. In addition, the first lens to the sixth lens may have at least one aspherical surface. That is, at least one of a first surface and a second surface of the first lens to the sixth lens may be aspherical.

Further, the optical system including the first lens to the sixth lens may have an F No. of 2.4 or less. In this case, the subject may be clearly imaged. For example, the lens module according to an exemplary embodiment of the present disclosure may be able to clearly capture an image of the subject, even under low illuminance conditions (for example, 100 lux or less).

The optical system including the first lens to the sixth lens may satisfy Conditional expressions 1.

$$0.36 < SD/f < 0.48 \quad \text{[Conditional expressions 1]}$$

In Conditional expressions 1, SD is a size of a stop opening and f is an overall focal length of the optical system.

The optical system including the first lens to the sixth lens may satisfy Conditional expressions 2.

$$1.1 < TTL/f < 1.35 \quad \text{[Conditional expressions 2]}$$

In Conditional expressions 2, TTL is a length from the first surface of the first lens to an image surface and f is an overall focal length of the optical system.

Here, in the case of the lens module having a value outside of a lower limit value of Conditional expressions 2, it may be difficult to secure optical performance of the lens module, and in the case of the lens module having a value outside of an upper limit value of Conditional expressions 2, it may be difficult to implement the miniaturization thereof.

The optical system including the first lens to the sixth lens may satisfy Conditional expressions 3.

$$V4-V5 < 5.0 \quad \text{[Conditional expressions 3]}$$

In Conditional expressions 3, V4 is an Abbe value of the fourth lens and V5 is the Abbe value of the fifth lens.

Here, the lens module satisfying Conditional expressions 3 may be easily miniaturized.

The optical system including the first lens to the sixth lens may satisfy Conditional expressions 4.

$$|R2| > |R1| \quad \text{[Conditional expressions 4]}$$

In Conditional expressions 4, R2 is a radius of curvature of the second surface of the first lens and R1 is a radius of curvature of the first surface of the first lens.

Here, in the case of the first lens satisfying Conditional expressions 4, a shape thereof may be easily fabricated and sensitivity thereof depending on fabrication tolerance may be reduced.

The optical system including the first lens to the sixth lens may satisfy Conditional expressions 5.

$$SA < 36 \quad \text{[Conditional expressions 5]}$$

In Conditional expressions 5, SA is a sweep angle of the second surface of the sixth lens.

Here, Conditional expressions 5 may be a numerical condition for significantly decreasing total reflection of the sixth lens. For example, the lens module having a value outside of the upper limit value of Conditional expressions 5 may easily generate an internal reflection.

The optical system including the first lens to the sixth lens may satisfy Conditional expressions 6.

$$0 < f1/f4 < 0.8 \quad \text{[Conditional expressions 6]}$$

In Conditional expressions 6, f1 is a focal length of the first lens, and f4 is a focal length of the fourth lens.

The optical system including the first lens to the sixth lens may satisfy Conditional expressions 7.

$$f5/f6 > 0.8 \quad \text{[Conditional expressions 7]}$$

In Conditional expressions 7, f5 is a focal length of the fifth lens, and f6 is a focal length of the sixth lens.

Next, the first to sixth lenses configuring the optical system will be described.

The first lens may have refractive power. For example, the first lens may have positive refractive power. The first surface of the first lens may be convex, and the second surface thereof may be concave. For example, the first lens may have a meniscus shape in which it is convex toward the object. At least one of the first and second surfaces of the first lens may be aspherical. For example, both surfaces of the first lens may be aspherical. The first lens may be formed of a material having high degrees of light transmissivity and processability. For example, the first lens may be formed of plastic. However, a material of the first lens is not limited to plastic. For example, the first lens may be formed of glass.

The second lens may have refractive power. For example, the second lens may have positive refractive power. Both surfaces of the second lens may be convex. At least one of the first and second surfaces of the second lens may be aspherical. For example, both surfaces of the second lens may be aspherical. The second lens may be formed of a material having high degrees of light transmissivity and processability. For example, the second lens may be formed of plastic. However, a material of the second lens is not limited to plastic. For example, the second lens may be formed of glass.

The third lens may have refractive power. For example, the third lens may have negative refractive power. Both surfaces of the third lens may be concave. Alternatively, the first surface of the third lens may be convex, and the second surface thereof may be concave. For example, the third lens may have a meniscus shape in which it is convex toward the object or a plano-convex shape in which it is convex toward the object. At least one of the first and second surfaces of the third lens may be aspherical. For example, both surfaces of the third lens may be aspherical. The third lens may be formed of a material having high degrees of light transmissivity and processability. For example, the third lens may be formed of plastic. However, a material of the third lens is not limited to plastic. For example, the third lens may be formed of glass. Further, the third lens may have a diameter smaller than those of the first and second lenses. For example, an effective diameter of the third lens (that is, a diameter of a portion in which available light is substantially incident and refracted) may be smaller than those of the first and second lenses.

The fourth lens may have refractive power. For example, the fourth lens may have positive refractive power. The first surface of the fourth lens may be concave, and the second surface thereof may be convex. For example, the fourth lens may have a meniscus shape in which it is convex toward the image or a plano-convex shape in which it is convex toward the image. At least one of the first and second surfaces of the fourth lens may be aspherical. For example, both surfaces of the fourth lens may be aspherical. The fourth lens may be formed of a material having high degrees of light transmissivity and processability. For example, the fourth lens may be formed of plastic. However, a material of the fourth lens is not limited to plastic. For example, the fourth lens may be formed of glass.

The fifth lens may have refractive power. For example, the fifth lens may have negative refractive power. The first surface of the fifth lens may be concave, and the second surface thereof may be convex. For example, the fifth lens may have a meniscus shape in which it is convex toward the image. At least one of the first and second surfaces of the fifth lens may be aspherical. For example, both surfaces of the fifth lens may be aspherical. The fifth lens may be formed of a material having high degrees of light transmissivity and processability. For example, the fifth lens may be formed of plastic. However, a material of the fifth lens is not limited to plastic. For example, the fifth lens may be formed of glass.

The sixth lens may have refractive power. For example, the sixth lens may have negative refractive power. The first surface of the sixth lens may be convex, and the second surface thereof may be concave. In addition, the sixth lens may have an inflection point formed on at least one surface thereof. For example, the second surface of the sixth lens may be concave at the center of the optical axis thereof and may be convex toward an edge thereof. At least one of the first and second surfaces of the sixth lens may be aspherical. For example, both surfaces of the sixth lens may be aspherical. The sixth lens may be formed of a material having high degrees of light transmissivity and processability. For example, the sixth lens may be formed of plastic. However, a material of the sixth lens is not limited to plastic. For example, the sixth lens may be formed of glass.

Meanwhile, in the lens module according to exemplary embodiments of the present disclosure, the first to sixth lenses may be disposed such that effective diameters thereof are decreased from the first lens toward the third lens and are increased from the fourth lens toward the sixth lens. The optical system configured as described above may increase an amount of light incident to the image sensor to thereby increase resolution of the lens module.

The lens module configured as described above may improve aberration, which may result in a deterioration of image quality. Further, the lens module configured as described above may improve resolution. Further, the lens module configured as described above may be allow for lightness and be advantageous in decreasing manufacturing costs.

A lens module according to an exemplary embodiment of the present disclosure will be described with reference to FIGS. 1 through 5.

A lens module 100 according to an exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In an exemplary embodiment of the present disclosure, the first lens 10 may have positive refractive power. In addition, a first surface of the first lens 10 may be convex, and a second surface thereof may be concave. The second lens 20 may have positive refractive power. In addition, both surfaces of the second lens 20 may be convex. The third lens 30 may have negative refractive power. In addition, a first surface of the third lens 30 may be convex, and a second surface thereof may be concave. The fourth lens 40 may have positive refractive power. In addition, a first surface of the fourth lens 40 may be concave, and a second surface thereof may be convex. The fifth lens 50 may have negative refractive power. In addition, a first surface of the fifth lens 50 may be concave, and a second surface thereof may be convex. The sixth lens 60 may have negative refractive power. In addition, a first surface of the sixth lens 60 may be convex, and a second surface thereof may be concave. Further, the sixth lens 60 may have an inflection point. For example, the sixth lens 60 may have an inflection point formed on the second surface thereof.

The lens module 100 according to an exemplary embodiment of the present disclosure may include at least one stop ST. For example, the stop ST may be disposed between the second lens 20 and the third lens 30. The stop ST disposed as described above may perform an adjustment of an amount of light and a vignetting function.

The lens module configured as described above may have aberration characteristics as shown in FIGS. 2 and 3 and lens characteristics as shown in FIGS. 4 and 5. For reference, FIG. 4 is a table showing radii of curvature, thicknesses, distances, and the like of the respective lenses, and FIG. 5 is a table showing aspherical surface values of the respective lenses.

For example, A(1) of FIG. 4 represents a radius of curvature of an object-side surface of the first lens and A(2) of FIG. 4 represents a radius of curvature of an image-side surface of the first lens. Here, values of A(1), A(2), (Ai) may be calculated through FIG. 5. For example, a value corresponding to A(1) of FIG. 4 is a reciprocal number of a value corresponding to A(1) in a column and CURV in a row in FIG. 5. As an example, a radius of curvature A(5) of an object-side surface of the third lens 30 may be 9.138 [mm], the reciprocal number of 0.109435 corresponding to A(5) in the column and CURV in the row in FIG. 5. As another example, a radius of curvature A(8) of an image-side surface of the fourth lens 40 may be −6.155 [mm], the reciprocal number of −0.162472 corresponding to A(8) in the column and CURV in the row in FIG. 5.

Further, the thicknesses of the respective lenses and distances between the lenses may be confirmed through FIG. 4. For example, a thickness of the first lens 10 may be 0.49 [mm] corresponding to 1 in a column and a thickness/distance in a row in FIG. 4, and a distance between the first lens 10 and the second lens 20 may be 0.0955 [mm], as described below the value of the thickness of the first lens 10.

Further, refractive indices and Abbe numbers of the respective lens may be confirmed through GLA values of FIG. 4. For example, the refractive index of the second lens 20 may be 1.544, and the Abbe number thereof may be 56.0. As another example, the refractive index of the third lens 30 may be 1.639, and the Abbe number thereof may be 23.0.

Next, a lens module according to another embodiment of the present invention will be described with reference to FIGS. 6 through 10.

The lens module 100 according to another exemplary embodiment of the present disclosure may include the optical system including the first lens 10, the second lens 20, the third lens 30, the fourth lens 40, the fifth lens 50, and the sixth lens 60, and may further include the infrared cut-off filter 70, and the image sensor 80.

In another exemplary embodiment of the present disclosure, the first lens 10 may have positive refractive power. In addition, the first surface of the first lens 10 may be convex, and the second surface thereof may be concave. The second lens 20 may have positive refractive power. In addition, both surfaces of the second lens 20 may be convex. The third lens 30 may have negative refractive power. In addition, the first surface of the third lens 30 may be convex, and the second surface thereof may be concave. The fourth lens 40 may have positive refractive power. In addition, the first surface of the fourth lens 40 may be concave, and the second surface thereof may be convex. The fifth lens 50 may have negative refractive power. In addition, the first surface of the fifth lens 50 may be concave, and the second surface thereof may be convex. The sixth lens 60 may have negative refractive power. In addition, the first surface of the sixth lens 60 may be convex, and the second surface thereof may be concave. Further, the sixth lens 60 may have an inflection point. For example, the sixth lens 60 may have an inflection point formed on the second surface thereof.

The lens module 100 according to another exemplary embodiment of the present disclosure may include at least one stop ST. For example, the stop ST may be disposed between the second lens 20 and the third lens 30. The stop ST disposed as described above may perform an adjustment of an amount of light and a vignetting function.

The lens module configured as described above may have aberration characteristics as shown in FIGS. 7 and 8 and lens characteristics as shown in FIGS. 9 and 10. For reference, FIG. 9 is a table showing radii of curvature, thicknesses, distances, and the like of the respective lenses, and FIG. 10 is a table showing aspherical surface values of the respective lenses.

For example, A(3) of FIG. 9 represents a radius of curvature of an object-side surface of the second lens and A(4) of FIG. 9 represents a radius of curvature of an image-side surface of the second lens. Here, values of A(1), A(2), (Ai) may be calculated through FIG. 10. For example, a value corresponding to A(3) of FIG. 9 is a reciprocal number of a value corresponding to A(3) in a column and CURV in a row in FIG. 10. As an example, a radius of curvature A(3) of the object-side surface of the second lens 20 may be 2.302 [mm], the reciprocal number of 0.434377 corresponding to A(3) in the column and CURV in the row in FIG. 10. As another example, a radius of curvature A(4) of an image-side surface of the second lens 20 may be −147.102 [mm], the reciprocal number of −0.006798 corresponding to A(4) in the column and CURV in the row in FIG. 10.

Further, the thicknesses of the respective lenses and distances between the lenses may be confirmed through FIG. 9. For example, a thickness of the third lens 30 may be 0.28 [mm] corresponding to 3 in the column and a thickness/distance in the row in FIG. 9, and a distance between the third lens 30 and the fourth lens 40 may be 0.45 [mm] as described below the value of the thickness of the third lens 30.

Further, refractive indices and Abbe numbers of the respective lens may be confirmed through GLA values of FIG. 10. For example, the refractive index of the fifth lens 50 may be 1.639, and the Abbe number thereof may be 23.0.

The respective exemplary embodiments of the present disclosure configured as described above are slightly different from each other in terms of some optical characteristics as shown in Table 1, but satisfy all of the Conditional expressions 1 to 7.

TABLE 1

| Note | First Exemplary Embodiment | Second Exemplary Embodiment |
| --- | --- | --- |
| FOV | 68 | 69 |
| F No. | 2.2 | 2 |
| TTL | 5.7 | 5.7 |
| f | 4.84 | 4.84 |

TABLE 1-continued

| Note | First Exemplary Embodiment | Second Exemplary Embodiment |
|---|---|---|
| f1 | 8.11 | 9.27 |
| f2 | 4.42 | 4.15 |
| f3 | −5.09 | −5.34 |
| f4 | 22.57 | 23.43 |
| f5 | −33.68 | −39.2 |
| f6 | −21.86 | −16.69 |
| SD/f | 0.38 | 0.41 |
| TTL/f | 1.17 | 1.18 |
| V4-V5 | 0 | 0 |
| |R2| − |R1| | 1.31 | 1.03 |
| SA | 33 | 35 |
| f1/f4 | 0.36 | 0.40 |
| f5/f6 | 1.54 | 2.35 |

As set forth above, according to exemplary embodiments of the present disclosure, high resolution may be implemented.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
a first lens having positive refractive power;
a second lens having positive refractive power;
a third lens having refractive power;
a fourth lens having positive refractive power;
a fifth lens having refractive power; and
a sixth lens having negative refractive power and having an inflection point formed on an image-side surface thereof,
wherein the first lens, the second lens, the third lens, the fourth lens, the fifth lens and the sixth lens are disposed in sequential order from the first lens to the sixth lens, and
wherein the lens module satisfies the following Conditional expressions:

$$0.36 < SD/f < 0.48$$ [Conditional expressions]

$$V4 - V5 < 5.0$$ [Conditional expressions]

where SD is a size of a stop opening and f is an overall focal length of the lens module,
where V4 is an Abbe number of the fourth lens, and V5 is an Abbe number of the fifth lens.

2. The lens module of claim 1, wherein the third lens has negative refractive power.

3. The lens module of claim 1, wherein the fifth lens has negative refractive power.

4. The lens module of claim 1, wherein an object-side surface of the first lens is convex, and an image-side surface thereof is concave.

5. The lens module of claim 1, wherein an object-side surface of the second lens is convex, and an image-side surface thereof is convex.

6. The lens module of claim 1, wherein an object-side surface of the third lens is convex, and an image-side surface thereof is concave.

7. The lens module of claim 1, wherein an object-side surface of the fourth lens is concave, and an image-side surface thereof is convex.

8. The lens module of claim 1, wherein an object-side surface of the fifth lens is concave, and an image-side surface thereof is convex.

9. The lens module of claim 1, wherein an object-side surface of the sixth lens is convex, and the image-side surface thereof is concave.

10. The lens module of claim 1, wherein the sixth lens has an inflection point formed on an object-side surface thereof.

11. The lens module of claim 1, wherein the lens module satisfies the following Conditional expressions:

$$1.1 < TTL/f < 1.35$$ [Conditional expressions]

where TTL is a distance from an object-side surface of the first lens to an image surface of an image sensor, and f is an overall focal length of the lens module.

12. The lens module of claim 1, wherein the lens module satisfies the following Conditional expressions:

$$|R2| - |R1| > 0$$ [Conditional expressions]

where R1 is a radius of curvature of an object-side surface of the first lens, and R2 is a radius of curvature of an image-side surface of the first lens.

13. The lens module of claim 1, wherein the lens module satisfies the following Conditional expressions:

$$SA < 36°$$ [Conditional expressions]

where SA is a sweep angle of the image-side surface of the sixth lens.

14. A lens module comprising:
a first lens having positive refractive power;
a second lens having positive refractive power;
a third lens having refractive power;
a fourth lens having positive refractive power;
a fifth lens having refractive power; and
a sixth lens having negative refractive power,
wherein the first lens, the second lens, the third lens, the fourth lens, the fifth lens and the sixth lens are disposed in sequential order from the first lens to the sixth lens, and
wherein the lens module satisfies the following Conditional expressions:

$$V5 < 30$$ [Conditional expressions]

$$V4 - V5 < 5.0$$ [Conditional expressions]

where V4 is an Abbe number of the fourth lens, and V5 is an Abbe number of the fifth lens.

15. The lens module of claim 14, wherein the third lens has negative refractive power.

16. The lens module of claim 14, wherein the fifth lens has negative refractive power.

17. The lens module of claim 14, wherein an object-side surface of the first lens is convex, and an image-side surface thereof is concave.

18. The lens module of claim 14, wherein an object-side surface of the second lens is convex, and an image-side surface thereof is convex.

19. The lens module of claim 14, wherein an object-side surface of the third lens is convex, and an image-side surface thereof is concave.

20. The lens module of claim 14, wherein an object-side surface of the fourth lens is concave, and an image-side surface thereof is convex.

21. The lens module of claim 14, wherein an object-side surface of the fifth lens is concave, and an image-side surface thereof is convex.

22. The lens module of claim 14, wherein an object-side surface of the sixth lens is convex, and an image-side surface thereof is concave.

23. The lens module of claim 14, wherein the sixth lens has an inflection point formed on an object-side surface thereof.

24. The lens module of claim 14, wherein the lens module satisfies the following Conditional expressions:

$1.1 < TTL/f < 1.4$ [Conditional expressions]

where TTL is a distance from an object-side surface of the first lens to an image surface of an image sensor, and f is an overall focal length of the lens module.

25. The lens module of claim 14, wherein the lens module satisfies the following Conditional expressions:

$|R2| - |R1| > 0$ [Conditional expressions]

where R1 is a radius of curvature of an object-side surface of the first lens, and R2 is a radius of curvature of an image-side surface of the first lens.

26. The lens module of claim 14, wherein the lens module satisfies the following Conditional expressions:

$SA < 36°$ [Conditional expressions]

where SA is a sweep angle of an image-side surface of the sixth lens.

27. The lens module of claim 14, wherein the lens module satisfies the following Conditional expressions:

$0.36 < SD/f < 0.48$ [Conditional expressions]

where SD is a size of a stop opening and f is an overall focal length of the lens module.

* * * * *